United States Patent
Fruth et al.

(10) Patent No.: US 9,186,847 B2
(45) Date of Patent: Nov. 17, 2015

(54) METHOD AND DEVICE FOR PRODUCING A THREE-DIMENSIONAL OBJECT

(75) Inventors: Carl Fruth, Parsberg (DE); David Hermann, Goeteborg (SE)

(73) Assignee: Sintermask GmbH, Parsberg (DE)

( * ) Notice: Subject to any disclaimer, the term of this patent is extended or adjusted under 35 U.S.C. 154(b) by 441 days.

(21) Appl. No.: 13/389,649

(22) PCT Filed: Aug. 18, 2010

(86) PCT No.: PCT/EP2010/005062
§ 371 (c)(1),
(2), (4) Date: Feb. 9, 2012

(87) PCT Pub. No.: WO2011/020599
PCT Pub. Date: Feb. 24, 2011

(65) Prior Publication Data
US 2012/0139167 A1    Jun. 7, 2012

(30) Foreign Application Priority Data
Aug. 18, 2009   (DE) .......................... 10 2009 037 815

(51) Int. Cl.
*B29C 35/08*      (2006.01)
*B29C 67/00*      (2006.01)

(52) U.S. Cl.
CPC ......... *B29C 67/0077* (2013.01); *B29C 67/0085* (2013.01)

(58) Field of Classification Search
USPC ............................... 425/174.4, 385; 264/308
See application file for complete search history.

(56) References Cited

U.S. PATENT DOCUMENTS

| | | | |
|---|---|---|---|
| 4,041,476 A | 8/1977 | Swainson | |
| 4,411,013 A | 10/1983 | Takasu et al. | |
| 5,076,869 A | 12/1991 | Bourell et al. | |
| 5,519,816 A | 5/1996 | Pomerantz et al. | |
| 6,110,409 A * | 8/2000 | Allanic et al. | 264/401 |
| 7,088,432 B2 * | 8/2006 | Zhang | 355/77 |
| 1,344,633 A1 | 11/2006 | Ueno | |
| 7,568,445 B2 | 8/2009 | Rosenberger et al. | |
| 2001/0048184 A1 | 12/2001 | Ueno | |
| 2008/0258346 A1 | 10/2008 | Simon et al. | |
| 2009/0266803 A1 | 10/2009 | Perret et al. | |
| 2011/0181941 A1 | 7/2011 | Henningsen | |

FOREIGN PATENT DOCUMENTS

| | | |
|---|---|---|
| DE | 1772836 A1 | 6/1971 |
| DE | 29911122 U1 | 9/1999 |
| DE | 10204985 A1 | 8/2003 |
| DE | 1344633 B1 | 7/2007 |
| DE | 60122383 T2 | 8/2007 |
| DE | 102007019133 A1 | 10/2008 |
| EP | 0055077 A2 | 6/1982 |
| EP | 1192041 B1 | 3/2003 |
| WO | 95/15841 A1 | 6/1995 |
| WO | 2006/122564 A1 | 11/2006 |
| WO | 2007/112808 A1 | 10/2007 |

* cited by examiner

*Primary Examiner* — James Sanders
(74) *Attorney, Agent, or Firm* — Laurence A. Greenberg; Werner H. Stemer; Ralph E. Locher

(57) ABSTRACT

A method for producing a three-dimensional object by selective solidification of a build material includes irradiating a surface of a mask with at least one radiation source. The mask is disposed at a distance from a build plane and an optical imaging system is used to produce a reproduction of the mask on the build plane.

18 Claims, 3 Drawing Sheets

METHOD AND DEVICE FOR PRODUCING A THREE-DIMENSIONAL OBJECT

BACKGROUND OF THE INVENTION

Field of the Invention

The invention relates to a method for manufacturing a three-dimensional object by selective solidification of a build material, in which a mask is areally irradiated with at least one radiation source.

A variety of generative methods for the manufacture of three-dimensional objects are known from the existing art, among them, for example, laser sintering or the selective mask sintering (SMS) process. With these thermal methods, three-dimensional objects are manufactured directly from CAD data with the aid of an additive production method. The object is built up in layers by the fact that layers of a build material are successively applied one above another. Before application of the next layers in each case, the locations in the respective layers corresponding to the object being produced are solidified. Solidification is accomplished by local heating of the powdered layering raw material with the aid of a radiation source. Because radiation is introduced in targeted fashion into the desired regions, an exactly defined object structure of any nature can be generated. The layer thickness is, in this context, also adjustable. A method of this kind is usable in particular for the manufacture of three-dimensional objects by successively generating multiple thin, individually configured layers.

Materials that are utilized in layer construction methods of this kind are, for example, resins, plastics, metals, or ceramics. Units with which a layer construction method of this kind is carried out are also referred to as "layer manufacturing" or "rapid prototyping" units.

In selective mask sintering as well, powder is applied in layers and selectively fused. In contrast to laser sintering, however, what is used instead of a point-like laser source is an areally effective radiation source (usually an infrared radiator) that areally irradiates the mask. Local fusing of an entire object plane in one step is thereby enabled, and the exposure time of a layer is independent of the complexity of the component.

The mask, made of IR-absorbent material (e.g. toner), is usually printed onto a transparent mask carrier, for example a glass panel, which is then placed immediately above a powder bed arranged in the build chamber. All the regions in the build plane not covered by the mask are then exposed and fused. The layer is created, after cooling, by thermal conduction into the powder and into the partly completed component.

In other words, the infrared radiator heats the surface of the powder bed through the mask, and locally fuses the particles. After solidification, they form a layer of the component being manufactured. This process is repeated layer after layer, a correspondingly structured mask being used at each exposure step in accordance with the object plane being generated. In other words, after each exposure step the mask is erased from the mask carrier and the mask carrier is imprinted with a new mask.

At the same time, the build platform is lowered a defined layer thickness after each exposure, and the lowered build space is filled with fresh powder and applied with a distributor similar to a ductor blade. Concurrently therewith, the mask carrier is displaced out of the build space, cleaned, and equipped with the new mask. The process then begins again, until all the layers have been exposed and the object has thus been completely manufactured.

Due to the use of multiple light sources, and because of diffraction effects, different shadow regions are produced behind the mask, such as core shadows and semi-shadows as well as so-called "color shadows" resulting from the use of different wavelength regions. With all build techniques known hitherto it is therefore necessary for the shadow-forming mask to be arranged directly in front of or above the layer to be exposed. In other words, in all methods known from the existing art, an effort is made to minimize the spacing between the mask and the build layer.

To reduce this spacing it has been proposed, for example, to apply the mask not onto the upper side but instead onto the lower side of the mask carrier. Leaving aside the fact that even this does not allow diffraction effects to be completely eliminated, it is disadvantageous that with this approach to a solution, masking material (toner) drops onto the component and contaminates the object layer.

Also disadvantageous in the context of all methods known hitherto is the fact that the mask becomes very hot as a result of irradiation; for example, temperatures between 150° and 190° C. can occur. The temperature stability of the masking material is low, however, so that masking material which has been used once cannot as a rule be used a second time.

BRIEF SUMMARY OF THE INVENTION

An object of the present invention is to optimize the manufacture of a three-dimensional object in light of the disadvantages of known methods known from the existing art. This object is achieved by a method and an apparatus according to the invention.

In accordance therewith, a method is proposed for manufacturing a three-dimensional object by selective solidification of a build material, in which method a mask is areally irradiated with at least one radiation source, this method being characterized in that the mask is arranged at a distance from the build plane, and an image of the mask is generated on the build plane with the aid of an imaging optical system.

Simultaneously proposed is an apparatus for manufacturing a three-dimensional object by selective solidification of a build material, a mask being areally irradiated with at least one radiation source, having a mask system encompassing a mask, having at least one radiation source, and having a build chamber for receiving a build plane, said apparatus being characterized in that the mask is arranged at a distance from the build plane, and an image of the mask is generated on the build plane with the aid of an imaging optical system.

Against the background of the manufacturing method made available by the invention, a novel build material and the use thereof are also described. A build material for the manufacture of a three-dimensional object by selective solidification is proposed, the build material having at least one material property that is activatable by irradiation of the material as a function of the radiation used.

Advantageous embodiments of the invention are described in the dependent claims. The advantages and embodiments explained below in connection with the method also apply mutatis mutandis to the system according to the present invention, and vice versa.

A core idea of the invention is to circumvent the problems mentioned above by arranging the mask at a distance from the build plane. In other words, it is proposed to increase the spacing between the build plane on the one hand, and the mask areally irradiated by the at least one radiation source on the other hand. This is achieved according to the present invention by using an imaging optical system, for example in the form of a lens system. The invention makes available a refined mask sintering method in which areal irradiation of the mask and, associated therewith, fusing of an entire object plane, is combined in a single step using a mask arranged at a distance from the build plane. The result is that a mask shadow is not imaged onto the build plane, as is the case with known systems. Instead an image of the mask is projected onto the build plane. In contrast to conventional methods, extremely large quantities of energy can be transferred and used for mask projection. It is thereby possible to increase the resolution and imaging accuracy as compared with known systems.

The term "imaging optical system" is understood in this context as an optical system that is embodied for realization of an optical image. In other words, by combining electromagnetic radiation that proceeds from one point of an object, an image is generated at an image point with the aid of the optical system. In terms of the present invention, this means that the imaging optical system generates an image of the mask in the build plane, which image is located in the build chamber. Expressed differently, the use of the imaging optical system allows the mask to be arranged in almost any position.

In order to irradiate the mask areally with the radiation proceeding from the radiation source, provision is furthermore made for an exposure system that interacts on the one hand with the mask and on the other hand with the imaging optical system in order to achieve the effect according to the present invention.

The exposure system, the imaging optical system, and the position of the mask are preferably coordinated with one another in such a way that a predominant portion of the undesired radiation proceeding from the areally irradiated mask (diffuse transmission, diffuse reflection) does not travel into the imaging optical system. In combination with the finite aperture of the imaging optical system, the formation of undesired shadows can thereby be substantially precluded. Use of the imaging optical system thus also serves to increase the contrast of the image. In addition, the aberrations resulting from differing wavelengths, for example chromatic aberration, can be compensated for by way of the imaging optical system.

When the mask is projected onto the build plane with the aid of the imaging optical system, what then occurs is, in other words, a magnified, reduced, or otherwise modified transfer of the mask image onto the build plane, which then serves as a projection surface. The invention thus allows on the one hand very small, high-resolution objects, and on the other hand very large objects with low resolution, to be manufactured in a single layer manufacturing unit. As a result of the magnification or reduction that is possible because of projection, the invention makes available, in combination with different mask resolutions, a particularly universally usable additive production method.

If a reduction of the mask occurs, the energy density in the build plane is then at the same time also increased by the imaging optical system. In other words, the mask serves as an "amplifier", such that both the quantity of energy introduced into the build plane per unit of time, and the quantity of energy introduced into the build plane per unit of area, can be individually controlled, in particular increased.

A "mask" is understood in the context of the present invention as a structure that permits a selective transmission of radiation. Expressed differently, each mask encompasses transparent regions ("openings") and opaque regions, and is transilluminated at least once by the radiation that is delivered by the radiation source, the radiation being at least partly absorbed upon transillumination.

The invention is independent of the mask technology used. The masks utilized can thus on the one hand be the toner masks already mentioned, in which a toner is printed as a masking material onto a glass plate or the like serving as a mask carrier. Instead of toner masks, however, LCD masks or masks that function according to the e-paper principle can also be used. It will be assumed hereinafter, by way of example, that a toner mask is being used.

The mask is preferably made of an at least partly absorbent masking material. In another embodiment, a masking material that reflects the incoming radiation nondirectionally, i.e. in diffuse fashion, is used. In other words, what occurs at the mask is either an at least partial absorption or else a diffuse reflection of the incident radiation.

The mask can be applied onto either a transparent or a reflective mask carrier. In other words, the mask carrier can itself be transilluminated, like the mask, or a diffuse reflection occurs of the radiation on the mask carrier that areally irradiates the mask. When a mirror system of this kind is used, the mask is transilluminated twice, since the radiation transilluminating the mask a first time is reflected at the mask carrier and then transilluminates the mask a second time before leaving the mask again. Because the mask is transilluminated twice in this case, the optical density of the masking material can be lower than is necessary in the case of a one-time transillumination. As a consequence, either a different masking material can be used, or less masking material needs be applied onto the mask carrier than in the case of a transparent mask carrier.

It is particularly advantageous if the temperature of the mask carrier is modifiable. This can be accomplished on the one hand by "passive" temperature control, for example by using a mask carrier made of metal in which, because of the high thermal conductivity, rapid heat dissipation of the energy absorbed by the masking material and transferred into the mask carrier, and thus cooling of the mask, takes place. Alternatively or in addition thereto, "active" temperature control of the mask carrier can occur. Active cooling of the mask carrier, so that the overall temperature stress on the masking material can be lowered, is particularly possible. Alternatively thereto, of course, it is likewise possible to heat the mask carrier.

If the temperature stress on the masking material is low, it can be used several times, i.e. for multiple fusing operations.

In a further advantageous embodiment of the invention, the at least one radiation source is arranged movably. This is advantageous in particular when a particularly uniform quantity of energy per unit of area on the build plane can be achieved by movement of the radiation source.

A large number of further advantages can be achieved if multiple radiation sources that can be used simultaneously or alternatively to one another are provided.

For one thing, it is then possible to increase the total quantity of energy introduced, or the energy density, in the image. Because a particularly large amount of energy can be introduced into the build plane per unit of time, fusing and thus the build process are accelerated.

Whereas only comparatively low power levels can be achieved with conventional projection systems, the technology according to the present invention works in completely different power level dimensions. The energy density used when carrying out the method according to the present invention for fusing conventional plastic material, e.g. polyamide, is thus for example in a range from 1 to 10 watts per square centimeter, preferably in a range from 2 to 5 watts per square centimeter. With conventional units, on the other hand, energy densities are typically in a range from 0.001 to 0.05 watts per square centimeter.

The last optical component of the projection system (the imaging optical system) preferably transfers a radiation power level of at least one kilowatt. In a preferred embodiment of the invention, the build plane receives an energy of 2 to 5 kilowatts.

With the aid of the invention it is possible to increase the energy flux incident onto the build plane. If spectrally narrow-band radiation sources are used in this context, the contrast and thus the resolution accuracy or imaging accuracy, i.e. the accuracy with which the mask is imaged onto the build plane, can be considerably increased. When broad-band radiation sources are used, on the other hand, more energy can be transferred at the cost of resolution accuracy. The operation of a layer manufacturing unit in which both narrow-band and broad-band radiation sources are provided can therefore be easily adapted to different requirements. A layer manufacturing unit of this kind is particularly universally usable.

If multiple radiation sources are used, it is moreover advantageous, in order to avoid aberrations, if the dimensions of the sources are as small as possible. Those radiation sources that correspond as much as possible to ideal point sources are preferably used.

When multiple radiation sources are used it is furthermore possible to introduce different quantities of energy into different sub-regions of the image. Selective exposure is thus possible.

Various further exposure variants can be implemented if the multiple radiation sources are at the same time sources having different power levels and/or having different wavelengths or wavelength spectra. It is then not only possible to cause specific sub-regions of the image to be irradiated with multiple radiation sources, if applicable of different types. Control can also be exercised as to what quantities of energy are introduced into which sub-regions of the image. The maximum power level of each exposure step is moreover individually adjustable, and it is possible to use, in the manufacture of the three-dimensional object, build materials whose material properties are activatable in wavelength-dependent fashion, as will be described in further detail later on.

When multiple radiation sources are used, provision can be made that those radiation sources that would supply energy to completely masked portions of the image are switched off during the solidification operation. Unnecessary heating of the mask and mask carrier can thereby be avoided.

The increased spacing between the mask and the build plane results, in terms of design, in a separation of the mask system and build chamber. Not only does this result in less temperature stress on the masking material, but the temperature distribution in the build chamber can also be improved as compared with the conventional methods, since a defined build chamber atmosphere (pressure, temperature, etc.) can be created in the build chamber. In particular, a vacuum can be generated in the build chamber, thereby making possible a particularly clean manufacturing method. If the imaging optical system is furthermore embodied so that it delimits the build chamber, then an "optical window" in the build chamber is no longer necessary.

The imaging optical system itself preferably encompasses at least one lens. In practice, a lens system is generally used. The exposure system preferably encompasses a homogenizer ("light mixer"), arranged between the radiation source and the mask, which directs the radiation coming from the radiation source onto the mask and ensures full-coverage irradiation of the mask. Instead of the homogenizer, other optical elements can also be used as constituents of the exposure system.

In an embodiment of the invention, the imaging optical system encompasses a reflective mask carrier and an Offner relay arrangement. This is a non-magnifying optical assembly having two concentric mirrors, in which all major aberrations are effectively canceled out. Fundamentals of the principle of such an arrangement are described, for example, in U.S. Pat. No. 3,748,015. In the present case as well, the Offner relay arrangement is used chiefly in order to eliminate errors from the image. In a particularly preferred embodiment of the invention, the Offner relay arrangement is the only optical assembly of the imaging optical system.

The mask carrier is preferably arranged movably in such a way that it can be moved out of the beam path of the imaging optical system in order to change the mask. The mask carrier is preferably not moved for magnification or reduction of the image of the mask. Instead a corresponding positioning of the elements of the imaging optical system, for example individual lenses, occurs.

When radiation sources having different wavelengths or wavelength spectra are used, e.g. infrared radiation sources, ultraviolet radiation sources, etc., then in addition to the basic material that fuses upon absorption of radiation of a specific working wavelength, an additional absorber material is mixed into the build material that is usually present in powdered form. This additional absorber material absorbs radiation at a further wavelength, or radiation of a further wavelength spectrum, different from the working wavelength. At the same time, a specific property of the build material is activated by the absorption of this further radiation. It is thus possible, for example, for defined regions that are irradiated not only with the working wavelength but at the same time with the further wavelength to be colored if a color change occurs in the build material as a result of absorption of the additional wavelength. Other material properties that can be activated by the absorption of radiation of a specific wavelength are possible. It is moreover also possible to provide a build material that reacts to different working wavelengths, one of the working wavelengths simultaneously also being a wavelength with which a specific material property can be activated.

BRIEF DESCRIPTION OF THE SEVERAL VIEWS OF THE DRAWING

An exemplifying embodiment of the invention is explained in further detail below with reference to the drawings, in which.

DESCRIPTION OF THE INVENTION

Figure 1:
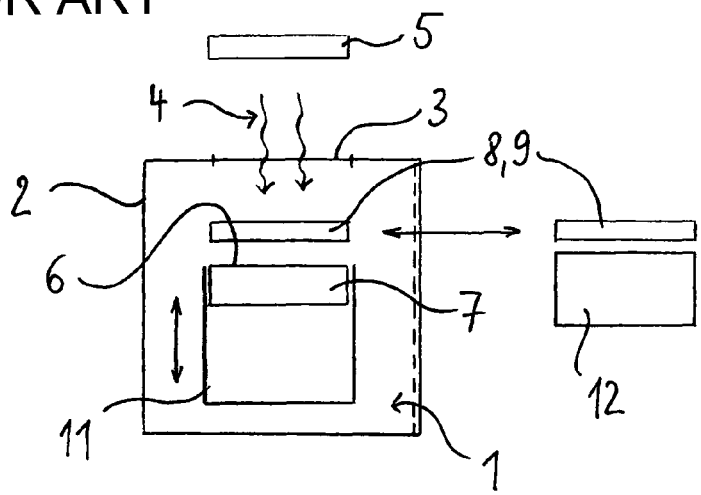
FIG. 1 depicts a layer manufacturing unit according to the existing art.

All the Figures show the invention merely schematically and with its essential constituents. Identical reference characters refer in this context to elements having an identical or comparable function.

A layer manufacturing unit known from the existing art is illustrated schematically in FIG. 1. Provided in build chamber 2 of the unit, which delimits build space 1, is an optical window 3 through which infrared radiation 4 can enter build chamber 2 from a radiation source 5 arranged outside build chamber 2. Toner mask 9, arranged in said chamber on a mask carrier 8 immediately above build plane 6 of object 7 to be manufactured, is irradiated areally with infrared radiation 4, with the result that a layer of object 7 is built up. After exposure of the layer, powder bed 11 moves a defined distance downward and mask carrier 8 is moved out of build chamber 2 for imprinting, by a printer 12, of mask 9 required for exposure of the next layer.

Figure 2:
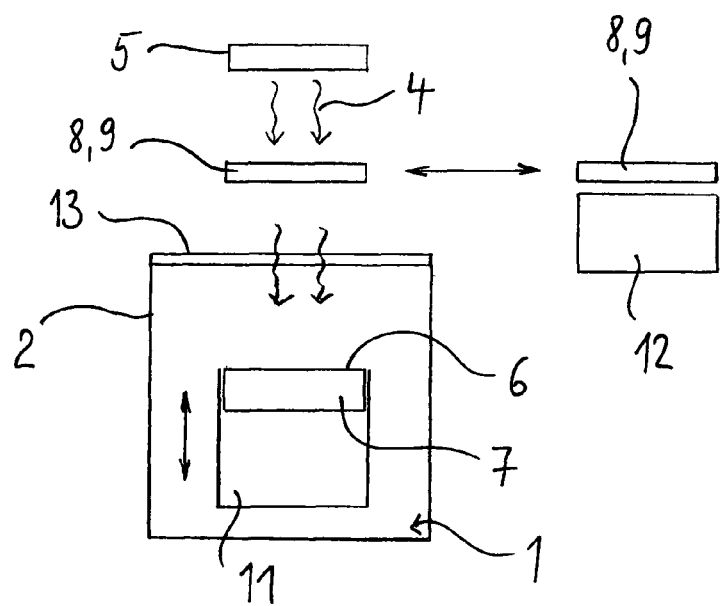
FIG. 2 depicts a layer manufacturing unit according to the present invention.

FIG. 2, in contrast thereto, schematically depicts a layer manufacturing unit according to the present invention. The mask system used here is arranged outside build chamber 2. In particular, mask carrier 8 having toner mask 9 is arranged at a distance from build plane 6 located in build chamber 2, and in fact outside build chamber 2 and spatially separately therefrom. Build chamber 2 itself is sealed. A vacuum exists in the interior of build chamber 2 and thus in build space 1. Build chamber 2 is delimited physically by one element 13 of an imaging optical system. Element 13 of the imaging optical system, which element forms a build chamber boundary, is e.g. a lens of the lens system of the imaging optical system.

An infrared radiator serves as radiation source 5. It irradiates the entire surface of mask 9. Further elements of the imaging optical system are not illustrated for reasons of simplicity. In the variant depicted, element 13 schematically symbolizes the entire imaging optical system. In actuality, the imaging optical system usually encompasses multiple (including, as a rule, different) optical elements such as, for example, lenses, filters, mirrors, or the like.

Toner mask 9 irradiated by the radiation source is arranged outside build chamber 2, at a distance from build plane 6. The image of mask 9 on build plane 6 is generated using the imaging optical system, by the fact that an image of mask 9 is projected onto build plane 6.

Figure 3:
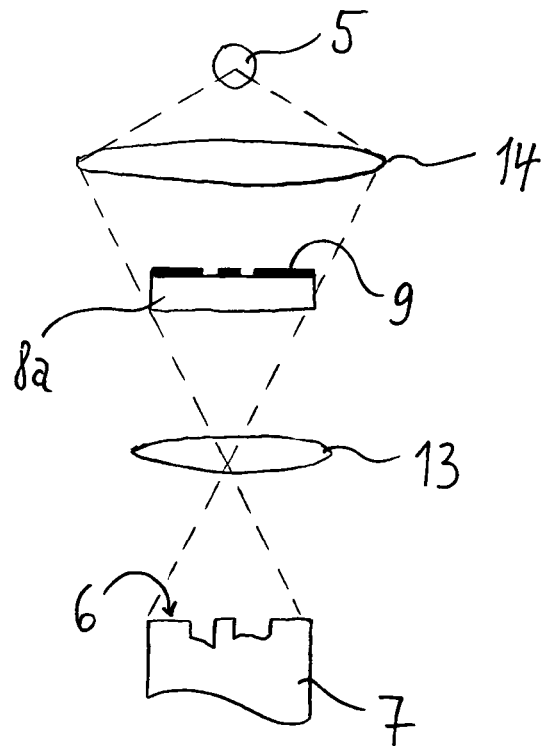
FIG. 3 depicts a beam path in the context of transillumination of the mask carrier.

In the embodiment of the invention depicted in FIG. 3, mask 9 is arranged on a transparent mask carrier 8a. Infrared radiation 4 emitted from radiation source 5 is applied over the entire surface of mask 9 using a homogenizer 14 arranged between radiation source 5 and mask 9, and transilluminates both mask 9 and mask carrier 8 before being coupled into the imaging optical system and projected onto build plane 6. The imaging optical system is once again symbolized here by optical element 13. Homogenizer 14 representatively denotes the exposure system. Instead of homogenizer 14, the exposure system could also encompass a collector lens or another optical component.

Figure 4:
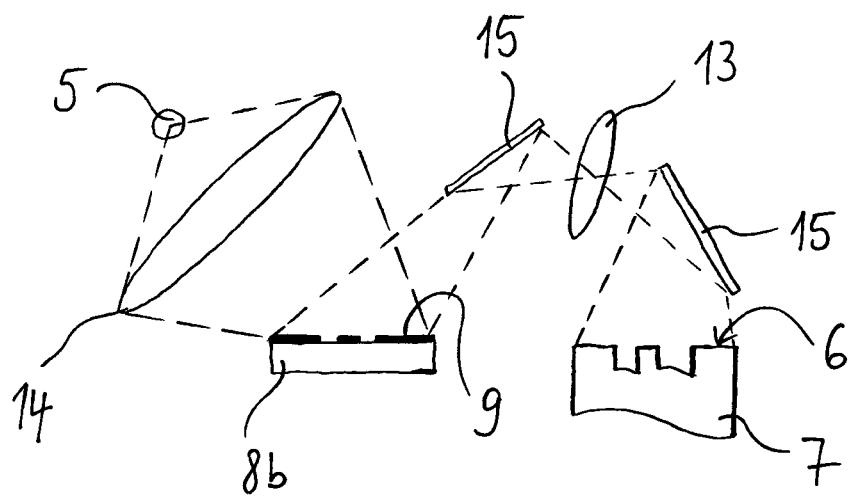
FIG. 4 depicts the beam path in the context of a mirror system.

In the embodiment of the invention depicted in FIG. 4, mask 9 is arranged on a reflective mask carrier 8b. Application of the masking material can be correspondingly optimized because of the double passage of infrared radiation 4 through mask 9. The imaging optical system here encompasses not only a lens 13 but also two mirrors 15.

In the embodiment of the invention shown, mask carrier 8 can be actively cooled so that the masking material (toner) used to generate mask 9 can be used several times.

Figure 5:
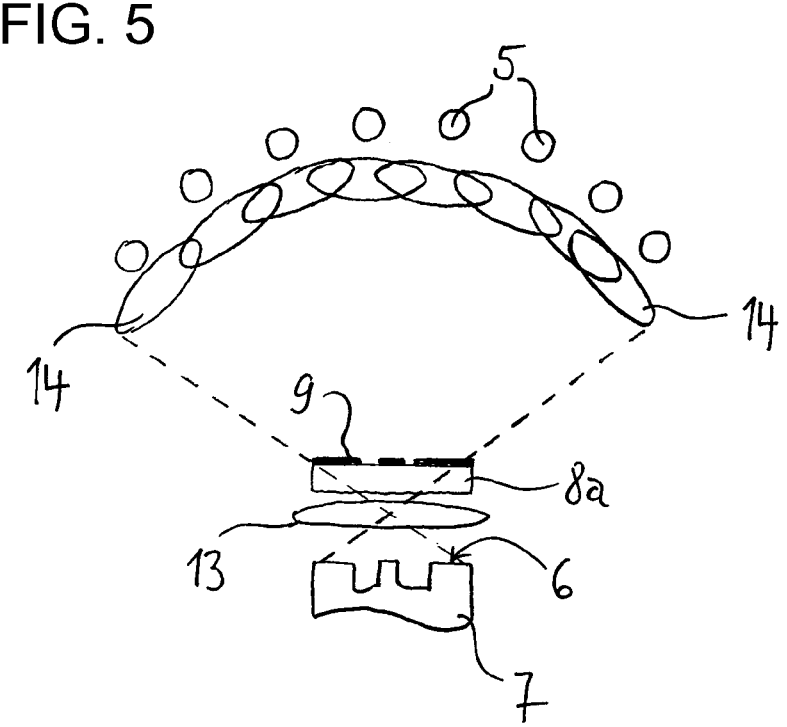
FIG. 5 depicts the beam path in the context of multiple radiation sources.

In the embodiment of the invention depicted in FIG. 5, multiple radiation sources 5 are provided which are used simultaneously, so that various quantities of energy can be introduced into different sub-regions of the image in build plane 6.

At the same time, radiation sources 5 having different power levels and different wavelengths or wavelength spectra are used, so that the energy input can be individually controlled for selected regions of the image. The use of build materials whose properties can be activated in wavelength-selective fashion thus makes it possible to manufacture objects having individual object properties. Radiation sources 5 that do not contribute to solidification of build plane 6 are switched off in this context.

Figure 6:
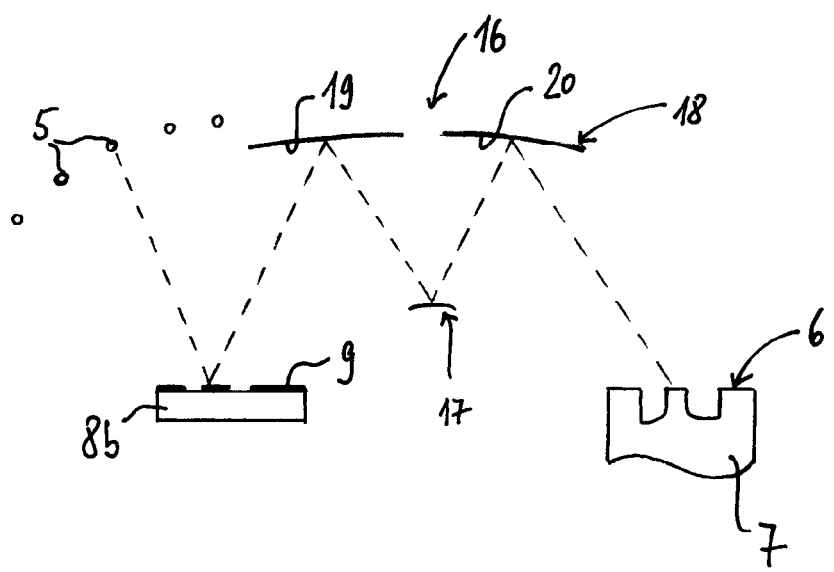
FIG. 6 depicts the beam path in the context of a mirror system having multiple radiation sources.

In the embodiment of the invention depicted in FIG. 6, as in the case of the embodiment depicted in FIG. 4, a reflective mask carrier 8b is used. In contrast thereto, however, multiple almost point-like radiation sources are used. The imaging optical system here encompasses no lenses but instead an Offner relay arrangement 16 having a central convex mirror 17 and a concave mirror 18. The radiation delivered from the radiation sources and incident onto mask 9 passes through mask 9 twice, since it is reflected at mask carrier 8b. The radiation proceeding from mask 9 strikes the first reflective region 19 of Offner relay arrangement 16. After three reflections within arrangement 16, the radiation leaves it and is projected onto build plane 6. The two reflective regions 19 and 20 belong to the same mirror 18 of Offner relay arrangement 16.

Both the imaging optical system and the exposure system are, in the embodiments depicted, shown merely symbolically. Both systems can encompass all possible optical components, depending on embodiment and on the result desired. Instead of the infrared radiator recited by way of example, it is possible to use radiation sources that operate at other wavelengths or wavelength regions.

All features presented in the description, the claims that follow, and the drawings can be essential to the invention both individually and in any combination with one another.

LIST OF REFERENCE CHARACTERS

1 Build space
2 Build chamber
3 Optical window
4 Infrared radiation
5 Radiation source
6 Build plane
7 Object
8 Mask carrier
9 Mask
10 (unassigned)
11 Powder bed
12 Printer
13 Element of imaging optical system
14 Homogenizer
15 Mirror
16 Offner relay arrangement
17 First mirror
18 Second mirror
19 First reflective region
20 Second reflective region

The invention claimed is:
1. A method for manufacturing a three-dimensional object by selective solidification of a build material, the method comprising the following steps:
   placing a mask on a reflective mask carrier and positioning the mask at a distance from a build plane in a build chamber;
   providing multiple radiation sources each being configured to areally irradiate the mask and to be used simultaneously or alternatively to one another;
   transilluminating the mask twice with radiation delivered by at least one of the multiple radiation sources; and
   generating an image of the mask on the build plane using an imaging optical system.

2. The method according to claim 1, which further comprises projecting an image of the mask onto the build plane.

3. The method according to claim 1, which further comprises forming the mask of at least one of:
   masking material at least partly absorbing a wavelength or wavelength spectrum of the at least one radiation source or
   masking material diffusely reflecting the wavelength or wavelength spectrum of the at least one radiation source.

4. The method according to claim 1, wherein the mask carrier is a variable-temperature mask carrier.

5. The method according to claim 1, which further comprises forming the mask of masking material and using the masking material several times.

6. The method according to claim 1, which further comprises providing at least one movably disposed radiation source in the at least one radiation source.

7. The method according to claim 1, which further comprises dividing an image into first and second sub-regions, and introducing a different quantity of energy into the first sub-regions than into the second sub-regions.

8. The method according to claim 1, which further comprises simultaneously using radiation sources having different power levels in the at least one radiation source.

9. The method according to claim 1, which further comprises simultaneously using radiation sources having different wavelengths or wavelength spectra in the at least one radiation source.

10. The method according to claim 1, which further comprises not activating radiation sources not contributing to solidification of the build plane, during a solidification operation.

11. An apparatus for manufacturing a three-dimensional object by selective solidification of a build material, the apparatus comprising:
   a build chamber for receiving a build plane;
   a mask system encompassing a reflective mask carrier and a mask disposed on said reflective mask carrier and positioned at a distance from said build plane;
   multiple radiation sources each being configured to areally irradiate said mask and to be used simultaneously or alternatively to one another, at least one of said multiple radiation sources delivering radiation transilluminating said mask twice; and
   an imaging optical system generating an image of said mask on said build plane.

12. The apparatus according to claim 11, wherein said mask is disposed outside said build chamber.

13. The apparatus according to claim 11, wherein said mask is physically separated from said build chamber.

14. The apparatus according to claim 11, wherein said imaging optical system or an element of said imaging optical system delimits said build chamber.

15. The apparatus according to claim 11, wherein said imaging optical system encompasses at least one lens.

16. The apparatus according to claim 11, which further comprises an exposure system for areal illumination of said mask.

17. The apparatus according to claim 16, wherein said exposure system includes a homogenizer disposed between said at least one radiation source and said mask.

18. The apparatus according to claim 11, wherein said mask carrier is disposed movably in a beam path of said imaging optical system.

* * * * *